Oct. 21, 1947. J. M. ROTH 2,429,489
UNLOADING VALVE
Filed Aug. 25, 1943 2 Sheets-Sheet 1

Inventor:
Jay M. Roth
By Edward C. Fritzbaugh
Atty.

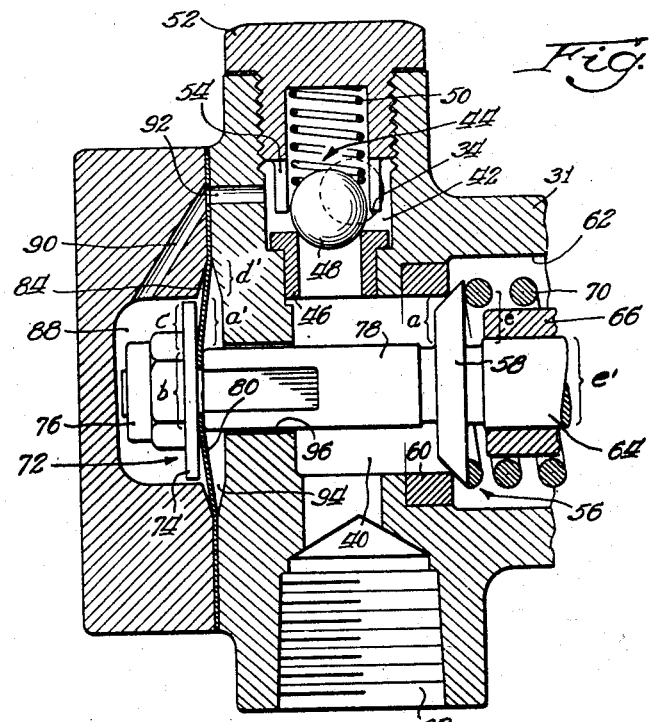
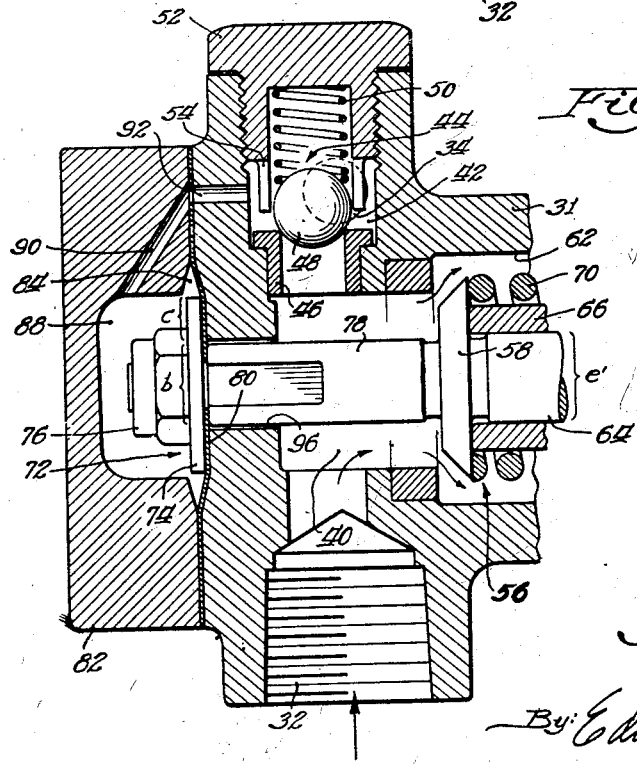

Patented Oct. 21, 1947

2,429,489

UNITED STATES PATENT OFFICE 2,429,489

UNLOADING VALVE

Jay M. Roth, Euclid, Ohio, assignor, by mesne assignments, to Borg-Warner Corporation, Chicago, Ill., a corporation of Illinois Application August 23, 1943, Serial No. 499,608

3 Claims. (Cl. 137—153)

This invention relates to hydraulic power transmission systems of the type wherein a power transmitting fluid is pumped by a continuously operating pump into an accumulator in which a supply of the fluid is maintained under pressure and from which the fluid is directed to hydraulic motor devices such as aileron and flap operating motors of aircraft. This invention constitutes an improvement upon the unloading valve mechanism disclosed in the application of Paul G. Lindberg, Serial No. 499,607, filed August 23, 1943, and has as its general object to provide a valve of the general type disclosed in that application but having a more definite and certain action.

The general object of the invention is to provide an improved pressure responsive valve mechanism adapted, at a determined maximum pressure, to cut off the flow of fluid to the accumulator and by-pass it back to the pump, and at a determined minimum pressure, to close the unloading port through which the by-passing has taken place, and reestablish the flow of fluid to the accumulator. A further object is to provide an improved pressure responsive unloading valve mechanism adapted to have a clean open and closing action, without flutter, at maximum limits at least one of which is adjustable.

These and other objects and features of this invention will become apparent from the following specification when taken together with the accompanying drawings in which:

Fig. 3 is a sectional view of the valve shown on the verge of opening; and

Fig. 4 is a sectional view of the valve shown in the open position.

Figure 1:
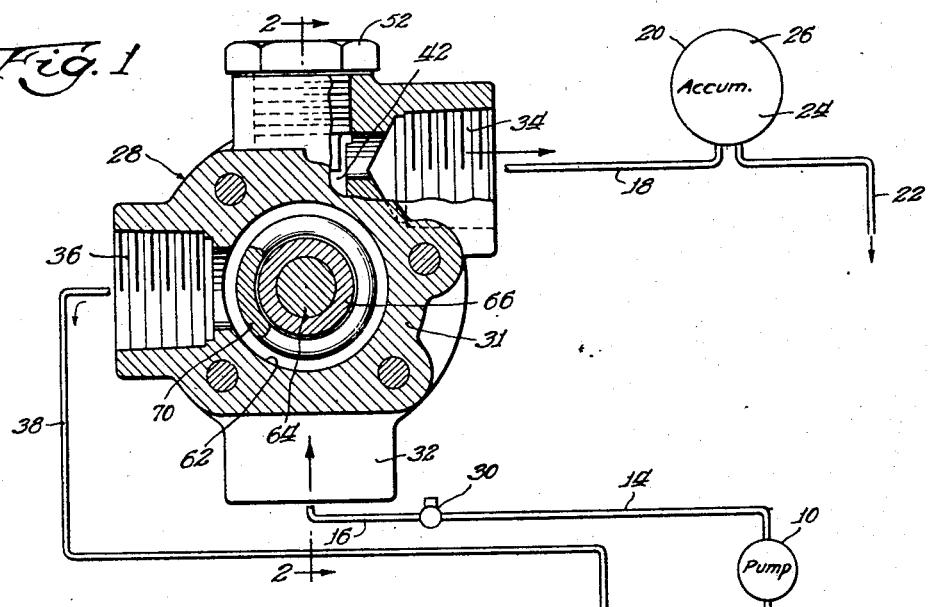
Fig. 1 is a schematic representation of a hydraulic power transmitting system embodying the invention.

As an example of one form in which the invention may be embodied, I have shown in the drawings a hydraulic power transmitting system for aircraft wherein an operating liquid is pumped by a pump 10 from a supply tank 12 through a pressure line 14, 16, 18 to an accumulator 20 from which the fluid is delivered through a line 22 to the motor devices which are operated by the system, such as for example, the motors for the aileron, landing flaps, etc. of aircraft. A body of operating fluid 24 is maintained in the accumulator and, above it, a body of gaseous fluid 26 under pressure.

While the operating fluid is delivered from the accumulator to the motor devices, the body of gas 26 will expand and the pressure therein will drop. The pump 10 renews the body of operating fluid 24, raising the pressure in the body of gas.

It is contemplated that the operating pressure in this system will be varied within fairly wide limits, such as for example a minimum of 700 pounds per square inch and a maximum of in the neighborhood of 1,000 pounds per square inch, this maximum being adjustable within limits.

The valve mechanism comprises a pressure relief valve 30 and an unloading valve assembly indicated generally at 28 interposed in series between the pump 10 and the accumulator 20, with the fluid line 14 connecting the pump 10 to the valve 30, the fluid line 16 connecting the valve 30 to the valve 28 and the fluid line 18 connecting the valve 28 to the accumulator 20.

The pressure relief valve 30 determines the maximum pressure limit and may be adjusted to vary this limit. The minimum pressure limit is determined in the unloading valve 28 as will be more fully explained hereinafter.

The unloading valve 28 comprises a housing or casing 31 having an inlet 32 to which the fluid line section 16 is attached, a pressure outlet 34 connected to the fluid line 18 leading to the accumulator, and an unloading outlet 36 which is connected through a return line 38 to the fluid supply tank 12. In the charging operation, fluid from the tank 12 is delivered by the pump 10 to the inlet 32 and from the outlet 34 through the line 18 to the accumulator 20. When the maximum pressure limit is reached, the fluid which the pump 10 continues to deliver to the inlet 32 is by-passed through the outlet 36 and the return line 38 directly back to the supply tank 12.

The housing 31 is provided with a chamber 40 communicating on one side with the inlet 32 and on its opposite side with a passage 42 which communicates with the outlet 34. The passage 42 is adapted to be closed by a ball check valve indicated generally at 44, said check valve comprising a valve seat bushing 46 mounted in the passage 42, a ball valve element 48 adapted to seat against the bushing 46, and a coil spring 50 for normally urging the ball 48 against the bushing 46. The coil spring 50 is retained by a cap 52 threaded into the housing 31 and having fingers 54 extending inwardly to form a cage for the valve element 48. Closing of the check valve 44 cuts off communication between the accumulator 20 and the chamber 40.

Unloading of the fluid through the line 38 is controlled by the unloading valve assembly indicated generally at 56 and comprising a valve proper 58 adapted to engage a valve seat 60 to close off communication between the chamber 40 and a passage 62 leading to the unloading outlet 36. The valve element 58 has a stem 64 which is guided in a sleeve 66 formed on a cap 68 secured to the housing 31. Encircling the sleeve 66 is a coil spring 70 which is engaged between the cap 68 and the valve element 58 for urging the latter toward its closed position.

Threaded into the center of the cap 68 is an orifice member 69 having an orifice 71 protected externally by a screen 73. The purpose of the orifice 71 is to eliminate dashpot action between the end of the stem 64 and the cap 68 and to subject the end of the stem 64 at all times to atmospheric pressure. A packing ring 75 is mounted on the end of the stem 64, to seal the passage 62 from the atmosphere. The passage 62 is therefore subject at all times to the pressure in the supply tank 12.

The valve 56 is controlled by a diaphragm motor assembly indicated generally at 72, and comprising a radial flange or piston-like member 74 secured to a stem 78 on the valve element 58, as by means of a nut 76 threaded on the end of the stem 78. A diaphragm 80 has its central region clamped between the piston 74 and the end of the stem 78 and its peripheral region clamped between the housing 31 and the motor casing plate 82 which is secured to the housing 31 in any suitable manner. The motor casing plate 82 has a recess 87, which, together with the diaphragm 80, defines a first motive pressure chamber 88 which communicates with the passage 42 through a port 90 in the casing plate 82 and a port 92 in the housing 31. When the valve 56 is closed there is formed between the housing 31 and the diaphragm 80 a second motive pressure chamber 94 which communicates with the chamber 40 through an opening 96 through which the stem 78 extends.

Figure 2:
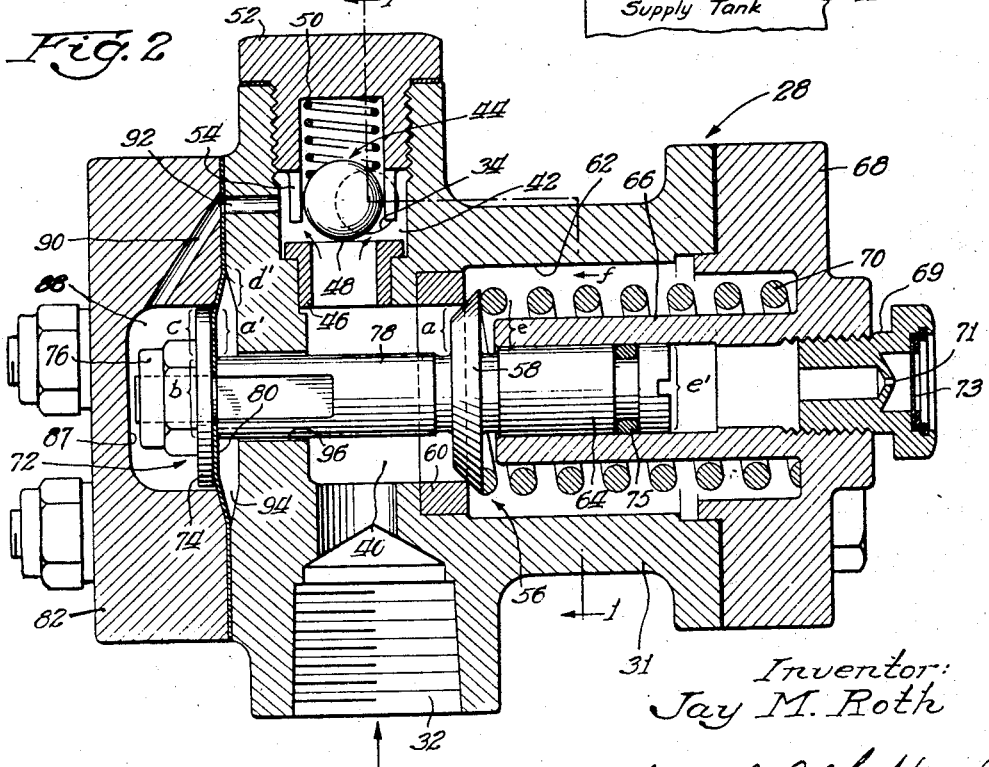
Fig. 2 is an axial sectional view through the major axis of the improved unloading valve of my invention, with the valve shown in the closed position.

When the valve is open to the accumulator, as shown in Fig. 2, with the unloading valve proper 56 closed, pressure in the chamber 40, communicated to the second motive pressure chamber 94 through the opening 96 will be higher than the pressure in the first motive pressure chamber 88, communicated from the passage 42, due to a pressure drop across the check valve 44. When pressures in the chambers 94 and 88 are equalized, a third motive pressure chamber 84 will be formed between the diaphragm and the motor casing plate 82 in an area lying outwardly of chamber 88. Chambers 84 and 94 are provided for by counter-boring the casing 31 around the opening 96 and by counter-boring the casing plate 82 around the recess 87.

In describing the operation of the system it will be assumed as a starting point that the system is operating on the charging side of the cycle, with the unloading valve proper 56 closed as shown in Fig. 2, and with the check valve 44 held open by the fluid which is being pumped therethrough by the pump 10. There will be a pressure drop across the valve 44 corresponding roughly to the resistance of the spring 50. The pressure in the first motive pressure chamber 88 will therefore be lower than that in the second motive pressure chamber 94 by an amount corresponding to said pressure drop. As a result, the diaphragm will be held snugly in contact with the inner face of the piston 74 as shown in Fig. 2, and the pressure in the chamber 94 will be applied through the diaphragm 80 to the piston 74. The diaphragm 80 will also be held by fluid pressure against the counterbore in the casing plate 82, thus eliminating the third motive pressure chamber 84.

The unloading and loading valve 58 will be held closed by a differential of forces acting in the closing direction over those acting in the opening direction. The forces tending to open the valve are indicated in Fig. 2 as follows: (a) fluid pressure in the chamber 40 acting against the inner face of the valve element 58; (c) fluid pressure in the first motive pressure chamber 88 acting against the piston 74 and nut 76 in an area corrsponding to the area $a$; (b) fluid pressure in the first motive pressure chamber 88 acting against the stem 78 and nut 76 in an area corresponding to the main cross sectional area of the stem 78. The forces tending to close the valve are: ($a'$) pressure on the piston 74 exerted through the diaphragm 80 by the fluid in the second motive pressure chamber 94; ($d'$) pressure in the second motive pressure chamber 84 acting against the diaphragm 80 in the area lying outwardly of the piston 74, said pressure being transmitted to the piston 74 by tension in the diaphragm 80; (e) supply tank pressure, corresponding with the port area 60, acting against the outer side of the valve element 58 (normally atmospheric pressure); ($e'$) atmospheric pressure at $e'$ against the end of stem 64, and ($f$) pressure of the spring 70 against the valve element 58.

Irrespective of the value of the pressure in the chamber 40, the action thereof against the area ($a$) will always be balanced by the action thereof against the area ($a'$) as long as the valve is closed and consequently the pressure against the areas ($a$) and ($a'$) may be disregarded for the closed position, and the pressure against the areas ($b$) and ($c$) may be regarded as balanced against the spring pressure ($f$) plus supply tank pressure against the area ($e$) and tension in the diaphragm 80 resulting from fluid pressure against the area ($d'$).

While the pressure in the accumulator is rising from the minimum to the maximum limit, there will be a differential of force in the valve closing direction, i. e., the spring pressure plus supply tank pressure against the area ($e$) plus atmospheric pressure against the area ($e'$) plus diaphragm tension under fluid pressure against the area ($d'$) and will be greater than the fluid pressure against areas ($b$) and ($c$) (the full area of the piston 74). When the maximum pressure is reached, the relief valve 30, which is set for said maximum pressure, will open, temporarily reducing the pressure in the chamber 40. As a result of this reduction in pressure the valve 44 will close, maintaining the pressure in the chamber 88 at the accumulator level. At some point in the pressure reduction, the pressure will be equalized between the chamber 94 and 88, eliminating the differential between these chambers. The diaphragm 80 will thereupon, under its own tension, pull away from the piston 74 to the position shown in Fig. 3, equalizing the pressure on the area $c$ with a corresponding pressure on the corresponding area on the inner side of the piston, and opening up the chamber 84, so as to permit the diaphragm to move freely toward the position shown in Fig. 3. The pressures against the areas $c$ and $a'$ and the corresponding areas between the piston 74 and diaphragm 80, will, under this condition, balance each other, leaving the pressures against the areas ($a$) and ($b$) acting to open the valve. These pressures are, at the maximum limit, sufficient to overcome the force of the spring pressure (f) plus the pressures against the areas (e) and (e'), and as a result the valve will commence to open. It may be noted at this point that the forces tending to maintain the valve closed have been reduced by the amount of the tension in the diaphragm 80 under the pressure against the area (d') in the chamber 94, this reduction being sufficient to unbalance the forces toward the valve opening side.

As the valve commences to open, fluid will escape from the chamber 40 to the passage 62, dropping the pressure in the chamber 40 below that in the chamber 88, and causing the diaphragm 80 to be drawn over against the surface of the casing 31 in the counterbore therein. The tension in the diaphragm 80 will now establish a pull against the valve stem 78 adding to the valve opening forces. This will accelerate the valve opening movement, causing the valve to open rapidly with a positive movement.

In the open position of the valve, shown in Fig. 4, the diaphragm 80 is sealed against the surface of the casing 31, eliminating the second motive pressure chamber 94 and the action of the fluid therein against the diaphragm 80. The valve will subsequently be held open by fluid pressure in the first motive pressure chamber 88 acting against the areas (b) and (c), plus fluid pressure in the chamber 84 against the diaphragm 88, transmitted to the stem 78 by tension in the diaphragm 80 and the differential of valve opening force over valve closing force thus established will be sufficiently great to maintain the valve in the open position while the pressure drops from the maximum to the minimum limit.

As the fluid is withdrawn from the accumulator 20, the pressure therein will drop until it reaches the minimum. At this point the pressure in the chambers 88 and 84, which have dropped correspondingly, will no longer be sufficient to overcome the valve opening forces, and the valve will therefore commence to close. This closing movement reopens the second motive pressure chamber 94, reestablishing the fluid pressure therein against the diaphragm 80 accelerating the movement. As the valve closes, a throttling action will be set up between the valve element 58 and its seat, increasing the pressure in the chambers 40 and 94 and increasing the differential of valve closing forces as the result of the increase in pressure against the area (d') of the diaphragm 80. As the pressure in the chamber 40 reaches the accumulator pressure, and passes it sufficiently to overcome the pressure of the ball check spring 50 the valve 44 will open and the differential in pressure in the chamber 94 over that in the chamber 88 will be reestablished. Consequently, the diaphragm 80 will be drawn over against the piston 74 and against the counterbore in the casing plate 82, sealing off the chamber 84 and reestablishing the valve closing force resulting from the pressure in the chamber 94 against the area (d') transmitted to the piston 74 by the tension in the differential diaphragm 80. This increase in the differential of force in valve closing direction is sufficient to hold the valve closed until the pressure again rises to the maximum limit whereupon the above-described cycle of operation will be repeated.

The orifice 71 eliminates dash-pot action, and maintains a uniform atmospheric pressure against the end of the stem 64 on the area (e'). This constitutes a definite improvement in the action of the valve over the prior art.

The reduction of the size of the piston 74 compared to that of the corresponding piston of the Lindberg device, and the substitution of differential pressure action against the outer region of the diaphragm 80 instead of the outer region of the piston 74, provides a smoother opening and closing action and a more cushioned action than that of the prior art.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:

1. A loading and unloading valve arrangement including a housing having an inlet adapted to receive pressure fluid from a fluid pressure supply line, a one-way check valve controlled outlet from said housing, an intermediate unloading outlet from said housing adapted to discharge to a low pressure zone, means defining a loading and unloading valve assembly including a main valve proper for controlling the flow through said intermediate outlet, motive means for moving said main valve to and from closed position, and control means responsive to a selected maximum value of pressure in said supply line effective to control the operating pressure on said motive means and cause the same to open said main unloading valve, and means responsive to the drop in pressure within said check valve controlled outlet to a selected minimum value effective to cause delivery of the supply pressure fluid to said motive means for applying a closing force to said main valve, said main valve assembly further including a coaxial piston-like stem extending from said main valve proper, means defining a cylinder for the reception of said piston, sealing means interposed between said piston and said cylinder defining means, an apertured closure for said cylinder for placing the outer terminal of said piston in constant communication with the surrounding atmosphere, and a coil compression spring surrounding said cylinder effective to urge said valve in the closing direction.

2. A pressure responsive loading and unloading valve assembly including a housing formed with a motor cylinder and a valve therein, a diaphragm dividing said cylinder into a first motive pressure chamber and a second motive pressure chamber, a plunger connecting said diaphragm with said valve passing through a wall of said motive cylinder, a flange-like piston extending radially from said plunger within said cylinder on the side of said diaphragm remote from said valve, means for effecting the delivery of fluid of a first value of pressure to said first motive pressure chamber, and for effecting the delivery of fluid of a lower value of pressure to said second chamber with the result that said diaphragm is held in close pressure engagement with said flange for applying a closing force to said valve, said means being effective to reduce said first pressure in communication with said first motive pressure chamber in response to the occurrence of a selected maximum value of pressure delivered to said first motive chamber whereby to increase the relative effectiveness of said pressure in said second motive pressure chamber for applying an opening force to said valve; said valve assembly further including a second coaxially extending piston-like plunger, means defining a second cylinder for the reception of said second piston, sealing means between said second piston and said second cylinder, an apertured closure for said second cylinder for placing the outer terminal of said second piston in constant communication with the surrounding atmosphere and a coil compression spring surrounding said second cylinder for urging said valve in the closing direction.

3. A loading and unloading valve arrangement for delivering pressure fluid from a fluid pressure supply line and maintaining a selected range of pressures; said arrangement including a valve housing with an inlet therein adapted to receive pressure fluid from said fluid pressure supply line, a pressure delivery outlet therefrom having a check valve therein for preventing reverse flow, and an intermediate unloading outlet adapted to deliver to a low pressure zone; means defining an unloading valve assembly including an unloading valve proper for controlling the flow through said unloading outlet; pressure responsive motive means for moving said unloading valve proper to and from closed position; and means for controlling the delivery of pressure fluid to said motive means for effecting the operation thereof including a relief valve communicating with said inlet, said relief valve being operable in response to a selected maximum pressure at said inlet; said unloading valve assembly further including a coaxial piston-like stem extending from said unloading valve proper, means defining a cylinder for the reception of said piston, sealing means interposed between said piston and said cylinder defining means, an apertured closure for said cylinder for placing the outer terminal of said piston in constant communication with the surrounding atmosphere and a coil compression spring surrounding said cylinder and effective to urge said valve in the closing direction; said motive means including a first pressure responsive motive portion acting in the valve closing direction, diaphragm means responsive to the movement of said unloading valve toward closed position for admitting inlet pressure fluid into pressure transmitting relation to said first motive portion, said motive means further including a second pressure responsive motive portion acting in the valve opening direction, means placing delivery fluid pressure beyond said check valve in constant communication with said second motive portion, the pressure responsive area of said first motive portion being less than the pressure responsive area of said second motive portion, the value of pressure delivered to said first motive portion being greater than that delivered to said second motive portion by an amount equal to the drop in pressure across said check valve prior to reaching said maximum value of pressure, the opening operation of said relief valve in response to said maximum inlet pressure resulting in said inlet pressure dropping below the value of delivery fluid pressure beyond said check valve and the consequent closing of said check valve, said drop in pressure acting on said first motive portion resulting in said delivery pressure acting on said second motive portion, predominating to thus cause movement of said motive means to open said unloading valve.

JAY M. ROTH.

REFERENCES CITED

The following references are of record in the file of this patent:

UNITED STATES PATENTS

| Number | Name | Date |
|---|---|---|
| 726,841 | Ball | May 5, 1903 |
| 2,210,295 | Johnson | Aug. 6, 1940 |
| 1,636,561 | Hazard | July 19, 1927 |
| 738,161 | Christensen | Sept. 8, 1903 |
| 559,881 | Ahrens | May 12, 1896 |
| 1,110,567 | McAulay | Sept. 15, 1914 |
| 615,812 | Dallett | Dec. 13, 1898 |
| 1,991,227 | Proctor | Feb. 12, 1935 |